United States Patent
Montigny et al.

(10) Patent No.: US 12,398,075 B2
(45) Date of Patent: Aug. 26, 2025

(54) WET ACCELERATOR, A METHOD OF PREPARING A WET ACCELERATOR AND A METHOD OF PRODUCING A GYPSUM PRODUCT

(71) Applicant: Saint-Gobain Placo, Courbevoie (FR)

(72) Inventors: Benoit Montigny, Courbevoie (FR); Christine Nguyen, Courbevoie (FR); Charlotte Catteau, Courbevoie (FR)

(73) Assignee: Saint-Gobain Placo, Courbevoie (FR)

( * ) Notice: Subject to any disclaimer, the term of this patent is extended or adjusted under 35 U.S.C. 154(b) by 293 days.

(21) Appl. No.: 17/761,093

(22) PCT Filed: Feb. 10, 2021

(86) PCT No.: PCT/EP2021/053223
§ 371 (c)(1),
(2) Date: Mar. 16, 2022

(87) PCT Pub. No.: WO2021/170410
PCT Pub. Date: Sep. 2, 2021

(65) Prior Publication Data
US 2022/0411331 A1 Dec. 29, 2022

(30) Foreign Application Priority Data
Feb. 25, 2020 (EP) .................................. 20305179

(51) Int. Cl.
*C08L 33/02* (2006.01)
*C04B 22/16* (2006.01)
(Continued)

(52) U.S. Cl.
CPC ............ *C04B 28/141* (2013.01); *C04B 22/16* (2013.01); *C04B 24/246* (2013.01);
(Continued)

(58) Field of Classification Search
CPC ....... C04B 11/00–30; C04B 28/14–141; C08L 33/02
See application file for complete search history.

(56) References Cited

U.S. PATENT DOCUMENTS

2006/0243171 A1* 11/2006 Yu ........................ C04B 40/0039
106/781
2014/0303289 A1* 10/2014 Muller .................... C04B 28/16
524/5
2018/0305257 A1 10/2018 Lu et al.

FOREIGN PATENT DOCUMENTS

EP        2 607 332         6/2013
WO     WO-2004083146 A2 *  9/2004  ......... B28B 19/0092

OTHER PUBLICATIONS

Swift, T. et al., "The pH-responsive behaviour of poly(acrylic acid) in aqueous solution is dependent on molar mass". Soft Matter 2016, 12, 2542-2549. (Year: 2016).*
(Continued)

*Primary Examiner* — Richard A. Huhn
(74) *Attorney, Agent, or Firm* — McDonnell Boehnen Hulbert & Berghoff LLP

(57) ABSTRACT

According to the present invention, there is provided a wet accelerator for use in the manufacture of a gypsum product, said wet accelerator comprising water, particles of calcium sulphate dihydrate and a stabiliser. Additionally, a method of preparing a wet accelerator and a method of producing a gypsum product are described.

21 Claims, 1 Drawing Sheet

(51) Int. Cl.
*C04B 24/24* (2006.01)
*C04B 24/26* (2006.01)
*C04B 28/14* (2006.01)
*C04B 28/16* (2006.01)
*C04B 40/00* (2006.01)
*C04B 103/10* (2006.01)

(52) U.S. Cl.
CPC .......... *C04B 24/2641* (2013.01); *C04B 28/16* (2013.01); *C04B 40/0039* (2013.01); *C04B 2103/10* (2013.01); *C08L 33/02* (2013.01)

(56) References Cited

OTHER PUBLICATIONS

International Search Report and Written Opinion for International Application No. PCT/EP2021/053223 mailed Apr. 29, 2021, 12 pages.

* cited by examiner

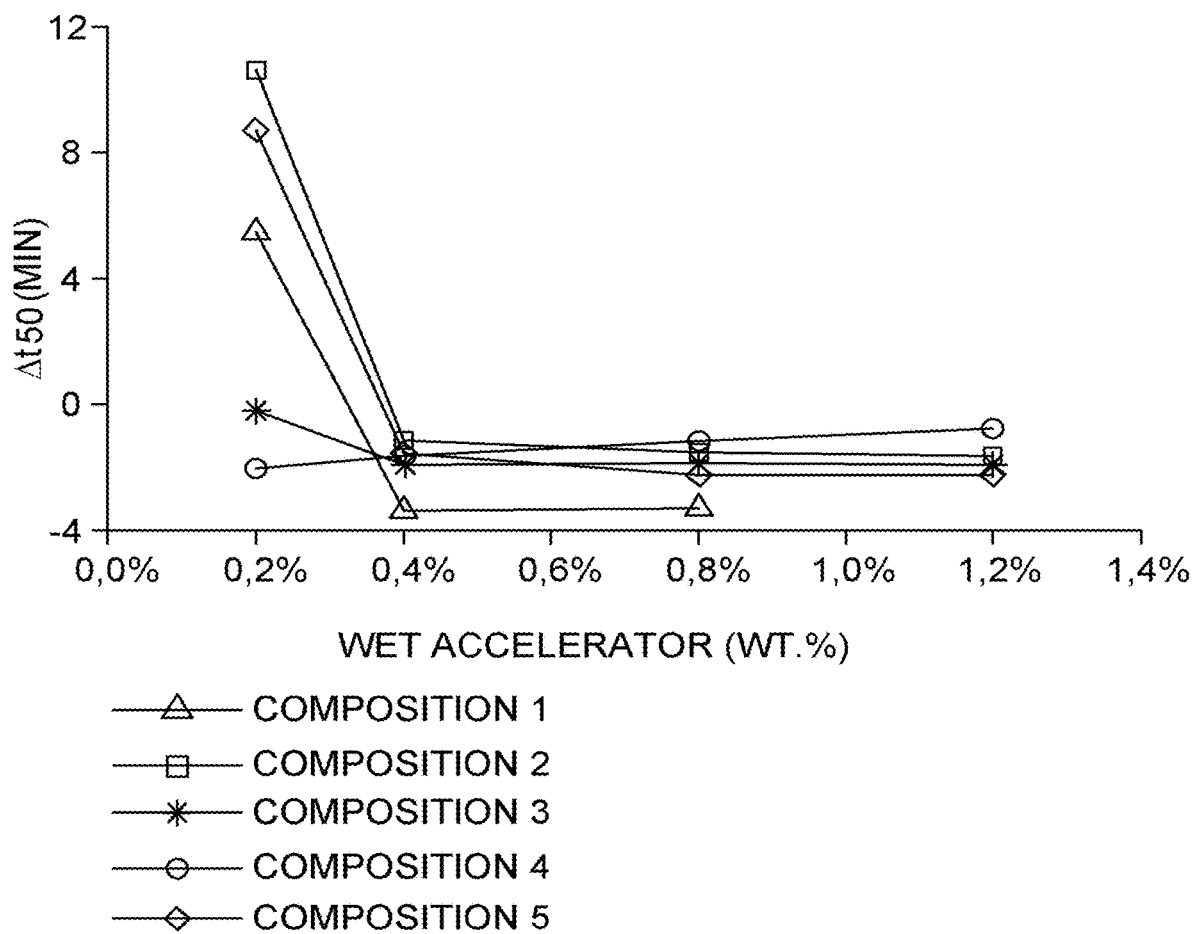

WET ACCELERATOR, A METHOD OF PREPARING A WET ACCELERATOR AND A METHOD OF PRODUCING A GYPSUM PRODUCT

CROSS-REFERENCE TO RELATED APPLICATIONS

The present application is a U.S. National Stage application of International Patent Application no. PCT/EP2021/053223, filed Feb. 10, 2021, which claims the benefit of priority of European Patent Application no. 20305179.2, filed Feb. 25, 2019.

FIELD OF THE INVENTION

The present invention relates to a wet accelerator, and more particularly to a wet accelerator for use in the production of a gypsum product. A method of preparing a wet accelerator and a method of producing a gypsum product are also described.

BACKGROUND OF THE INVENTION

Gypsum ($CaSO_4 \cdot 2H_2O$) is commonly used to make building products, particularly gypsum wallboard. Gypsum is a plentiful and generally inexpensive raw material which, through a process of dehydration (or calcination) and rehydration, can be cast, moulded or otherwise formed into useful shapes. The base material from which gypsum wallboard and other gypsum products are manufactured is the hemihydrate form of calcium sulphate ($CaSO_4(\frac{1}{2})H_2O$). Calcium sulphate hemihydrate is commonly known as stucco, and is generally prepared by heating gypsum to archive the desired dehydration. Further heating of stucco can result in the formation of calcium sulphate anhydrite ($CaSO_4$).

Commonly, gypsum products are prepared by forming a mixture of calcium sulphate hemihydrate and/or calcium sulphate anhydrite and water. Other components such as fibres, may also be added to the mixture, often referred to as a slurry, as desired. Subsequently, the slurry is cast or formed into a desired shape and the calcium sulphate hemihydrate and/or calcium sulphate anhydrite reacts with the water in the slurry to form a crystalline gypsum matrix, forming the structure of the gypsum product. Gentle heating is often used to drive off any unreacted water to yield the final, dry product and reduce manufacturing times.

It is generally desirable to reduce the amount of time required for the gypsum product to set and dry, as this reduces the overall cost of the manufacturing process. With this aim, accelerators are often incorporated into the slurry. Most commonly, the accelerator material includes finely ground gypsum particles. These gypsum particles act as nucleation sites for the formation of the gypsum crystals which form the structure of the gypsum product, reducing the thermodynamic barrier associated with the formation of the gypsum matrix. Simply put, the energy barrier associated with the growth of new gypsum on the surface of a pre-existing gypsum crystal is lower than the energy barrier associated with the formation of an entirely new crystal. As such, the use of accelerators increases the speed at which a gypsum matrix can be formed in the production process. Given the effect of the accelerators is based on their surface, there is a general advantage in reducing the size of the gypsum particles within the accelerator, although it is essential that the gypsum particles do not become so small they dissolve in the slurry.

However, there are problems associated with the use of gypsum particles as an accelerator. The effect of the gypsum particles on accelerating the setting of a gypsum product is due to their surface properties. As such, during periods of storage, the gypsum particles can become less effective, sometimes to the extent that their effect on the setting time of a gypsum product becomes very limited. As such, the effective storage of these solid accelerators can be problematic.

Recently, the use of liquid accelerators has come into focus. Here, the issue of prolonged storage can be overcome as the gypsum particles can be stored as part of a slurry including a stabiliser. Whilst the liquid accelerator remains in storage, the stabiliser can prevent the degradation of the surface of the gypsum particles which reduces their efficacy, ensuring the accelerator retains a long shelf life. Liquid accelerators are also advantageous as they can be incorporated into a slurry at various stages during the production process.

Whilst wet accelerators containing additives such as sodium trimetaphosphate (STMP) are known, this is an emerging area of technology which is still undergoing optimisation, both in terms of the shelf life of the accelerator and the properties of the formed gypsum products. For example, it is suspected that the high levels of stabiliser used in presently available wet accelerators, to ensure a long shelf life and effective preparation of the wet accelerator, may interact with other components within commercial products, reducing their overall quality. Objects and aspects of the present invention seek to address these points.

SUMMARY OF THE INVENTION

According to a first aspect of the present invention, there is provided a wet accelerator for use in the manufacture of a gypsum product, the wet accelerator comprising water; particles of calcium sulphate dihydrate ($CaSO_4 \cdot 2H_2O$) and a stabiliser, wherein the stabiliser comprises a soluble polymer of the formula;

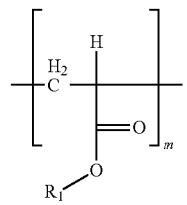

wherein $R_1$ is selected from the group consisting of H and a cation; and wherein m is any positive integer.

In the above formula, it is understood that the link between O and $R_1$ can be either a covalent bond or an ionic bond, typically where $R_1$ is a cation or the hydrogen atom is protonated in solution.

In this way, there is advantageously provided a wet accelerator which is stable over long periods. The incorporation of the stabiliser into the wet accelerator ensures that the properties of the surface of the particles of calcium sulphate dihydrate does not alter over time, and that there is no reduction in the efficacy of the wet accelerator over time. Additionally, the use of a stabiliser other than STMP may be advantageous when the inclusion of STMP in a wet accelerator a final gypsum product is undesirable.

In relation to the present invention, a gypsum product may be a gypsum wallboard, a gypsum board, stucco, mortar, finishing plaster, jointing compound, filler, screed, marble plaster or any other calcium sulphate based product.

Preferably, $R_1$ is H. Where $R_1$ is H, this may increase the solubility of the polymer such that it more effectively stabilises the particles of calcium sulphate dihydrate within the wet accelerator. It is understood that rapid deprotonation of the polymer may occur in use due to the pH of the gypsum slurry to which the wet accelerator is added. Alternatively, the polymer comprises a salt. In this case, $R_1$ is a cation. More preferably, $R_1$ is a monovalent cation. Still more preferably, $R_1$ is selected from the group consisting of $Na^+$, $K^+$, $Li^+$, $NH_4^+$ or $Cu^+$. Alternatively, R1 is a divalent cation (or more), one charge is balanced with the carbonyl group of the polymer as shown in the formula and the other charge(s) may be balanced by another anion in the solution or another carbonyl of the polymer. Preferably, $R_1$ is $Ca^{2+}$.

Preferably, the first $pK_a$ of the stabiliser is larger than or equal to 4. More preferably, the first $pK_a$ of the stabiliser is larger than 4. Preferably, the stabiliser has an average molecular weight of between 500 and 10000 g/mol inclusive. More preferably, the stabiliser has an average molecular weight of between 1000 and 5000 g/mol inclusive. Most preferably, the stabiliser has an average molecular weight of 2000 g/mol.

Preferably, the stabiliser is present in an amount of at least 0.01 wt. % relative to the dry weight of the particles of calcium sulphate dihydrate. More preferably, the stabiliser is present in an amount of at least 0.05 wt. % relative to the dry weight of the particles of calcium sulphate dihydrate. Still more preferably, the stabiliser is present in an amount of at least 0.1 wt. % relative to the dry weight of the particles of calcium sulphate dihydrate. It may be preferable for the stabiliser to be present in an amount of up to 5 wt. % relative to the dry weight of the particles of calcium sulphate dihydrate, more preferably 2 wt %. It may be advantageous to include such amounts of stabiliser to ensure all of the particles of calcium sulphate dihydrate within the wet accelerator are effectively stabilised.

Preferably, particles of calcium sulphate dihydrate form at least 10 wt. % and at most 50 wt. % of the wet accelerator, based on the wet weight of the accelerator. More preferably, particles of calcium sulphate dihydrate form at least 15 wt. % and at most 45 wt. % of the wet accelerator. Still more preferably, particles of calcium sulphate dihydrate form at least 20 wt. % and at most 40 wt. % of the wet accelerator. Most preferably, particles of calcium sulphate dihydrate form at 20 wt. % of the wet accelerator.

Preferably, at least 50% by number of the particles of calcium sulphate dihydrate have a diameter of less than 5 µm. More preferably, at least 60% of the particles of calcium sulphate dihydrate have a diameter of less than 5 µm. Most preferably, at least 70% by number of the particles of calcium sulphate dihydrate have a diameter of less than 5 µm. The incorporation of fine particles within the wet accelerator may improve its ability to accelerate the setting of gypsum products.

Preferably, the particles of calcium sulphate dihydrate have a surface area of between 5 and 30 m²/g. Here, the surface area of the particles is measured by BET as described in the Journal of American Chemical Society 60 (1938), pages 309 to 316 with degassing conditions of 1080 minutes at 45° C.

According to a second aspect of the present invention, there is provided a method of producing a gypsum product comprising providing a slurry comprising water and inorganic material, the inorganic material comprising at least one of calcium sulphate hemihydrate and calcium sulphate anhydrite providing the wet accelerator described herein, introducing the wet accelerator into the slurry in an amount of between 0.1 and 4 wt. % relative to the total dry weight of the constituents of the slurry and of the accelerator, and allowing the slurry to set. Advantageously, such a method may allow the accelerated production of gypsum products such as plasterboards.

Slurry herein refers to a mixture of water and solid particles, and does not imply any restriction as to the viscosity of the mixture.

According to a third aspect of the present invention, there is provided a method of preparing a wet accelerator comprising; providing particles of inorganic material with the composition $CaSO_4(X)H_2O$, where X is in the range $0 \leq X \leq 2$, adding water, and adding a stabiliser, wet milling said particles of inorganic material, wherein said stabiliser comprises a soluble polymer of the formula;

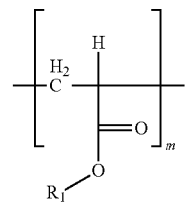

wherein $R_1$ is selected from the group consisting of H and a cation; and wherein m is any positive integer.

In this way, there is advantageously provided a method of producing a wet accelerator which is stable over long periods. The incorporation of the stabiliser into the wet accelerator ensures that the properties of the surface of the particles of calcium sulphate dihydrate do not alter over time, and that there is no reduction in the efficacy of the wet accelerator. Additionally, the use of a stabiliser other than STMP may be advantageous when the inclusion of STMP in a wet accelerator a final gypsum product is undesirable.

Additionally, the presence of the stabiliser during the milling process may advantageously stabilise the particles of inorganic material during the milling process. For example, the presence of the stabiliser may assist in preventing the dissolution and/or recrystallization of the particles of inorganic material during the milling process.

Preferably, X may be 0, and the inorganic material is calcium sulphate anhydrite. Alternatively, X may be 0.5, and the inorganic material is calcium sulphate hemihydrate. Alternatively, X may be 2, and the inorganic material is calcium sulphate dihydrate. Alternatively, the inorganic material may be a mixture of two or more of calcium sulphate dihydrate, calcium sulphate hemihydrate and calcium sulphate anhydrite.

Preferably, the step of adding the stabiliser occurs after the step of adding the water. More preferably, the wet milling step begins after the addition of the water and before the addition of the stabiliser. Such an embodiment may be preferred when the inorganic material comprises one or both of calcium sulphate hemihydrate and calcium sulphate anhydrite. Such features may be preferable as it may allow for the inorganic material to undergo favourable chemical or physical changes before the addition of the stabiliser. Such a change may be the hydration of the inorganic material. Where the wet milling step occurs after the addition of the water and before the addition of the stabiliser, it may be preferable for the method to further comprise a secondary wet milling step after the addition of the stabiliser. More preferably, the wet milling step may proceed continuously into the secondary wet milling step.

Alternatively, it may be preferable for the method to comprise, in order, the addition of the water, the addition of the stabiliser, and the wet milling of the particles of inorganic material.

Preferably, the stabiliser is present in an amount of between 0.01 wt. % and 5 wt. % inclusive relative to the dry weight of the inorganic material. More preferably, the stabiliser is present in an amount of between 0.05 wt. % and 2 wt. % inclusive relative to the dry weight of the inorganic material. Such a feature may be preferable to ensure that there is sufficient stabiliser to ensure that all particles of inorganic material are stabilised.

BRIEF DESCRIPTION OF THE FIGURE

The Figure is a graph depicting changes in the time taken to reach half of the total temperature increase (Δt50) when varying the amounts of wet accelerator in various compositions.

DETAILED DESCRIPTION

To investigate the properties of new wet accelerator formulations, a variety of wet accelerators were prepared using a wet grinding process. In each of the experiments discussed herein, calcium sulphate containing inorganic material, calcium sulphate dihydrate, was ground in the presence of water and stabiliser in a Labstar LS1 laboratory mill with a Zeta rotor. This process served to reduce the particle size of the inorganic material to increase the efficacy of the wet accelerator at the end of the production process.

During the wet grinding process, the Labstar LS1 was 85% filled with 0.8 mm Yttria-Zirconia beads and water, inorganic material and stabiliser added as required, with the mixture then ground for various periods to form wet accelerators. An agitator speed of 3700 rpm was used for all experiments.

The following wet accelerator formulations were tested.

| | Particles of Calcium Sulphate Dihydrate | Stabiliser |
|---|---|---|
| Composition 1 | 20 wt. % of wet accelerator | Polyacrylic acid (PAA) at 1.0 wt. % of the inorganic material (PAA molecular weight: 2000 g/mol). |
| Composition 2 | 20 wt. % of wet accelerator | Polyamino Polyether Methylene Phosphonic Acid (PAPEMP) at 1.0 wt. % of the inorganic material (PAPEMP molecular weight: 600 g/mol). |
| Composition 3 | 20 wt. % of wet accelerator | STMP at 1.0 wt. % of the inorganic material |
| Composition 4 | 20 wt. % of wet accelerator | STMP at 10.0 wt. % of the inorganic material |
| Composition 5 | 20 wt. % of wet accelerator | PAA at 0.5 wt. % of the inorganic material (PAA molecular weight: 2000 g/mol) and PAPEMP at 0.5 wt. % of the inorganic material (PAPEMP molecular weight: 600 g/mol). |

For each of the above compositions, water made up the remainder of the wet accelerator. The amount of water added was sufficient to ensure that the particles of calcium sulphate dihydrate was 20 wt. % of the overall wet accelerator. Each of the above compositions was ground for four hours to produce the final wet accelerator.

To investigate the effect of each composition on the setting time of a stucco slurry, samples of each composition were used to obtain experimental data. Here, each of the selected compositions was added to a stucco slurry and the variation in setting time measured. The stucco slurry comprises demineralised water and stucco with a water to stucco ratio of 0.8. Additionally, fluidiser (Naphthalene sulphonic acid condensation product (PNS)) and retarder (Plastretard™) were added to the stucco slurry to adjust the setting working range in accordance with the blender used for the mixing. In these experiments, each wet accelerator was added to the stucco slurry in four different amounts such that the solid content of the wet accelerator was between 0.2 and 1.2 wt. % of the stucco content of the slurry.

To characterise the effect of each wet accelerator on the setting time of the stucco slurry, the temperature of the slurry was monitored during the setting process. As the conversion of calcium sulphate hemihydrate to calcium sulphate dihydrate is an exothermic process, the temperature change of the slurry during the setting process can be used to deduce the speed at which the slurry is setting.

Control measurements were taken using a prior art dry accelerator with a surface area of 7 to 8 $m^2/g$ measured by BET. The method of BET measurement used was as described in the Journal of American Chemical Society 60 (1938), pages 309 to 316. The equipment used for the experiments was aa Tristar II from Micromeritics. The degassing conditions used before analysis were 1080 minutes at 45° C.

For all experiments, the slurry formulation was mixed in a blender and then placed into a semi-adiabatic cell. The total increase in temperature during setting was measured via a thermocouple, and the time taken to reach half the total temperature increase was calculated ($t50_{ref}$). Slurry setting experiments were then performed with each of the wet accelerator compounds, with the time taken for the slurry to reach half the total measured temperature increase measured in the same manner ($t50_{wet\ accelerator}$). The difference between the two was then taken as follows.

$$\Delta t50 = t50_{wet\ accelerator} - t50_{ref}$$

Δt50 was then plotted for each of the compositions and accelerator weight percentages in the FIGURE.

As can be seen from the FIGURE, Δt50 is negative for all compositions where the wet accelerator is added to the slurry at 0.4 wt. % or above. Therefore, in these cases the wet accelerator compositions were more effective in accelerating the setting of the slurry than the prior art dry accelerator. Additionally, it is notable above 0.4 wt. % accelerator, the use of PAA achieved the greatest increase in slurry setting speed, indicating that PAA is an effective stabiliser for wet accelerators.

The invention claimed is:

1. A wet accelerator for use in the manufacture of a gypsum product, said wet accelerator comprising
water,
particles of calcium sulphate dihydrate ($CaSO_4 \cdot 2H_2O$) wherein at least 50% of the particles of calcium sulphate dihydrate have a diameter of less than 5 μm, and a stabiliser, wherein said stabiliser comprises a soluble polymer of the formula;

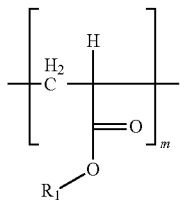

wherein said stabiliser has an average molecular weight of between 500 and 10,000 g/mol inclusive;
wherein $R_1$ is selected from the group consisting of H and a cation; and
wherein m is any positive integer.

2. The wet accelerator of claim 1, wherein the stabiliser has an average molecular weight of between 1000 and 5000 g/mol inclusive.

3. A wet accelerator for use in the manufacture of a gypsum product, said wet accelerator comprising
water,
particles of calcium sulphate dihydrate ($CaSO_4 \cdot 2H_2O$) wherein at least 50% of the particles of calcium sulphate dihydrate have a diameter of less than 5 μm, and
a stabiliser,
wherein said stabiliser comprises a soluble polymer of the formula;

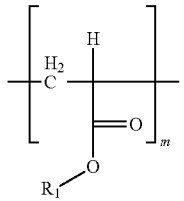

wherein $R_1$ is selected from the group consisting of H and a cation;
wherein m is any positive integer; and
wherein particles of calcium sulphate dihydrate form at least 10 wt. % and at most 50 wt. % of the wet accelerator.

4. The wet accelerator of claim 3, wherein $R_1$ is H.

5. The wet accelerator of claim 4, wherein the first $pK_a$ of said stabiliser is larger than or equal to 4.

6. The wet accelerator of claim 3, wherein the stabiliser is present in an amount of at least 0.01 wt. % relative to the dry weight of the particles of calcium sulphate dihydrate.

7. The wet accelerator of claim 3, wherein the stabiliser is present in an amount of at least 0.05 wt. % relative to the dry weight of the particles of calcium sulphate dihydrate.

8. The wet accelerator of claim 3, wherein the stabiliser is present in an amount up to 5 wt. % relative to the dry weight of the particles of calcium sulphate dihydrate.

9. The wet accelerator of claim 3, wherein the particles of calcium sulphate dihydrate form at least 15 wt. % and at most 45 wt. % of the wet accelerator.

10. The wet accelerator of claim 3, wherein particles of calcium sulphate dihydrate form at least 20 wt. % and at most 40 wt. % of the wet accelerator.

11. A wet accelerator for use in the manufacture of a gypsum product, said wet accelerator comprising
water,
particles of calcium sulphate dihydrate ($CaSO_4 \cdot 2H_2O$), wherein at least 60% of the particles of calcium sulphate dihydrate have a diameter of less than 5 μm and a stabiliser,
wherein said stabiliser comprises a soluble polymer of the formula;

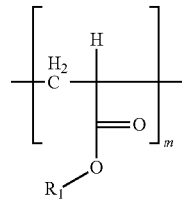

wherein $R_1$ is selected from the group consisting of H and a cation; and
wherein m is any positive integer.

12. The wet accelerator of claim 11, wherein at least 70% of the particles of calcium sulphate dihydrate have a diameter of less than 5 μm.

13. A wet accelerator for use in the manufacture of a gypsum product, said wet accelerator comprising
water,
particles of calcium sulphate dihydrate ($CaSO_4 \cdot 2H_2O$) wherein at least 50% of the particles of calcium sulphate dihydrate have a diameter of less than 5 μm,
and a stabiliser,
wherein said stabiliser comprises a soluble polymer of the formula;

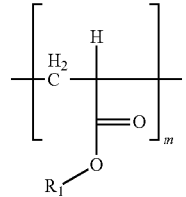

wherein $R_1$ is selected from the group consisting of H and a cation;
wherein m is any positive integer; and
wherein said particles of calcium sulphate dihydrate have a surface area of between 5 and 30 $m^2/g$.

14. A method of preparing the wet accelerator of claim 3, the method comprising:
providing particles of inorganic material with the composition $CaSO_4(X)H_2O$, where X is in the range $0 \leq X \leq 2$,
adding water,
adding said stabiliser, and
wet milling said particles of inorganic material.

15. The method of claim 14, wherein X is equal to 0.5.

16. The method of claim 14, wherein the stabiliser is present in an amount of at least 0.01 wt. % relative to the dry weight of the inorganic material.

17. The method of claim 14, wherein the step of adding said stabiliser occurs after the step of adding said water, and said wet milling step begins after the addition of said water and before the addition of said stabiliser.

18. A method of producing a gypsum product comprising:
providing a slurry comprising water and inorganic material, said inorganic material comprising at least one of calcium sulphate hemihydrate and calcium sulphate anhydrite, providing the wet accelerator of claim 3, introducing said wet accelerator into said slurry in an amount of between 0.1 and 4 wt. % of said inorganic material relative to the total dry weight of the constituents of the slurry and of the accelerator, and allowing said slurry to set.

19. A method of producing a gypsum product comprising:

providing a slurry comprising water and inorganic material, said inorganic material comprising at least one of calcium sulphate hemihydrate and calcium sulphate anhydrite, providing the wet accelerator of claim 1, introducing said wet accelerator into said slurry in an amount of between 0.1 and 4 wt. % of said inorganic material relative to the total dry weight of the constituents of the slurry and of the accelerator, and allowing said slurry to set.

20. A method of producing a gypsum product comprising:

providing a slurry comprising water and inorganic material, said inorganic material comprising at least one of calcium sulphate hemihydrate and calcium sulphate anhydrite, providing the wet accelerator of claim 11, introducing said wet accelerator into said slurry in an amount of between 0.1 and 4 wt. % of said inorganic material relative to the total dry weight of the constituents of the slurry and of the accelerator, and allowing said slurry to set.

21. A method of producing a gypsum product comprising:

providing a slurry comprising water and inorganic material, said inorganic material comprising at least one of calcium sulphate hemihydrate and calcium sulphate anhydrite, providing the wet accelerator of claim 11, introducing said wet accelerator into said slurry in an amount of between 0.1 and 4 wt. % of said inorganic material relative to the total dry weight of the constituents of the slurry and of the accelerator, and allowing said slurry to set.

\* \* \* \* \*